Nov. 10, 1936.  G. H. THOMAS  2,060,140
FLEXIBLE COUPLING
Filed Aug. 26, 1935  2 Sheets-Sheet 2

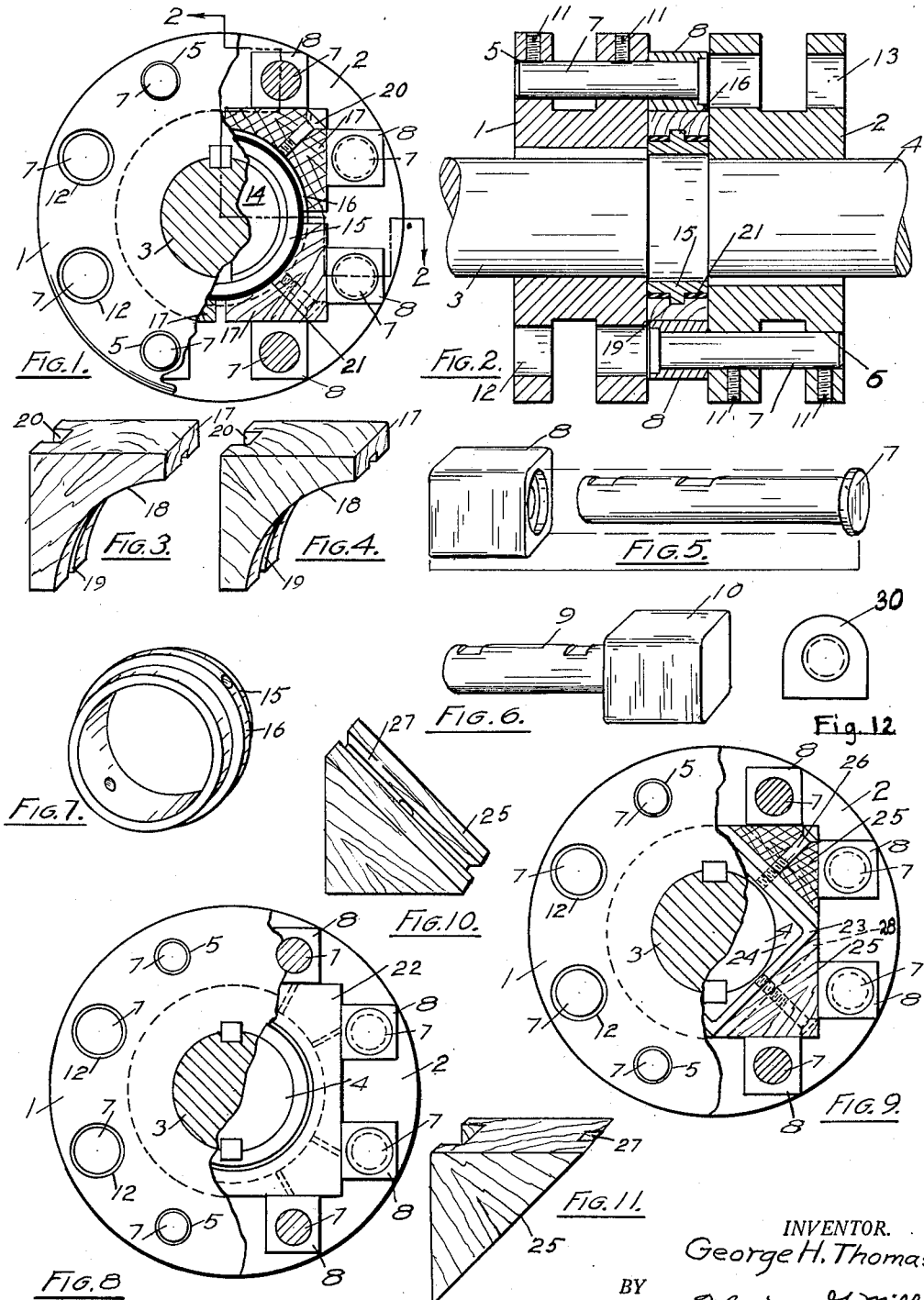

INVENTOR.
George H. Thomas
BY
Florian G. Miller
ATTORNEY.

Patented Nov. 10, 1936

2,060,140

UNITED STATES PATENT OFFICE 2,060,140

FLEXIBLE COUPLING

George H. Thomas, Erie, Pa.

Application August 26, 1935, Serial No. 38,786

15 Claims. (Cl. 64—31)

This invention relates to shaft couplings and more particularly to flexible shaft couplings by which power can be transmitted from one shaft to another when the shafts are misaligned angularly, off-center, or both; and also to permit substantial endwise and rotational movement.

All devices of this particular character made according to the teachings of the prior art and with which I am familiar utilized relatively small portions of their bearing surfaces requiring frequent replacement involving considerable expense, with resulting loss of time and loss of the use of the connecting machines. It is impossible to properly true the shafts of these machines with the driving and driven members in place on the shaft. All such couplings now in use have driving and driven jaws with only one surface which may be used as a bearing surface to engage the coupling member. The coupling members now in use require the replacement of the entire member when excessive wear takes place in a localized area which is at diagonally opposite corners. When the shafts extend into the opening provided in the ordinary coupling member the whole coupling must be disassembled to remove the coupling member.

It is, accordingly, an object of my invention to provide a coupling which will overcome these defects and it is the principal object of my invention to provide driving and driven jaws for a flexible coupling whose four sides may be used as bearing surfaces to engage a coupling member, thereby increasing the useful life of the jaws fourfold, and which can be easily and quickly renewed at small cost.

Another object of my invention is to provide a coupling having detachable jaws to enable or permit the disconnection of connected machines without molesting the driving and driven members of the coupling or the connected machines.

Another object of my invention is to provide a coupling member disposed in a plurality of parts in order that easily removable parts may be placed at points of greatest wear to obviate any necessity for replacement of the entire coupling member.

Another object of my invention is to provide a coupling which is easy to manufacture, economical in cost, easy to assemble initially and when the shafts are in a fixed position, and economical in maintenance.

Another object of my invention is to provide a coupling member and driving and driven jaws for engagement with said coupling member which provides a maximum of wearing surface with minimum time and materials necessary for replacement due to wear.

Another object of my invention is to provide a plurality of driving and driven jaws for a coupling which are movable independent of each other and replaceable when the coupling is in assembled position.

Another object of my invention is to provide a coupling member comprising a plurality of parts and a plurality of jaws engaging said coupling member, the parts of said coupling member and the jaws all being readily replaceable with the coupling in assembled position.

Another object of my invention is to provide driving and driven jaws having inner bearing surfaces, in engagement with a coupling member, capable of moving to various angled positions to remain in parallel relation to the bearing surfaces of the coupling member.

Another object of my invention is to provide a coupling having independently removable or detachable jaws and other parts permitting easy assembly or disassembly and cushioned to permit substantial relative rotation of the driving and driven members of the coupling.

Other objects of my invention will become evident from the following detailed description, taken in conjunction with the accompanying drawings, in which—

Fig. 1 is a view in end elevation partly in section showing the preferred form of my novel invention.

Fig. 2 is a view in section taken on the line 2—2 of Fig. 1.

Fig. 3 is a perspective view of the segmental block used in the coupling member shown in Fig. 1.

Fig. 4 is a perspective view of the segmental block of Fig. 3 with the grain running in a diagonally opposite direction.

Fig. 5 is a perspective view of the jaw and stud used on the driving and driven members.

Fig. 6 is a perspective view of a modified form of jaw and stud shown in Fig. 4.

Fig. 7 is a perspective view of the annular supporting member of the coupling member shown in Fig. 1.

Fig. 8 is an end view partly broken away showing the use of a solid lubricating block used with my novel jaw members.

Fig. 9 is a view in end elevation partly in section showing a modified form of coupling member.

Fig. 10 is a perspective view of the segmental block used in the coupling member shown in Fig. 8.

Fig. 11 is a perspective view of the segmental block of Fig. 10 with the grain of the wood running in a diagonally opposite direction.

Fig. 12 is a plan view of a modified form of pivoted jaw.

Figure 13:
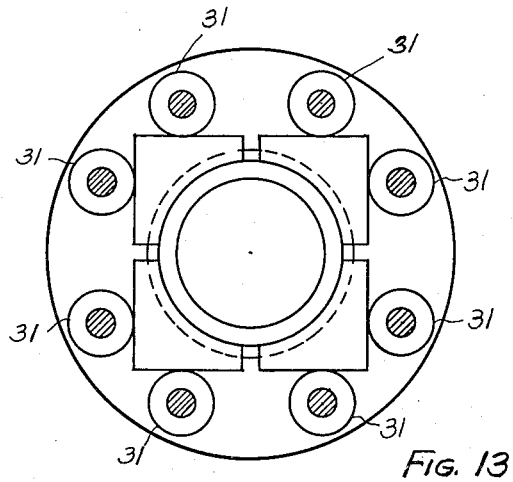

Figs. 13, 14, 15, and 16 are views in end elevation showing the different forms of jaw members which may be used in my coupling.

Referring to the drawings, the members shown in Figs. 1 and 2 comprise a complementary driving member 1 and a driven member 2 mounted on shafts 3 and 4 both of like construction and capable of operating in a forward or in a reverse direction. Apertures 5 and 6 are provided in the driving and driven members 1 and 2 for receiving the shanks of the studs 7 which secure the square sleeves or jaws 8 in a position on the driving and driven members 1 and 2. The jaws 8 are square in cross-section which enables four sides thereof to be used as bearing surfaces. Fig. 6 shows a stud 9 with the head 10 thereof having a square cross-section which may be used in place of the studs 7 and square sleeves or jaws 8. Set-screws 11 secure the studs 7 or 9 against movement in the apertures 5 and 6. Apertures 12 and 13 are provided to remove the studs 7 and 9 while the coupling is in an assembled position.

The coupling member 14 comprises a centrally located inner annular ring 15 having a tongue 16 extending around the periphery thereof adapted to seat four segmental blocks 17 around the periphery thereof. The inner portions 18 of the blocks 17 are semi-circular in shape and are provided with a groove 19 for engagement with the tongue 16 to prevent lateral movement of the blocks 17 when mounted on the annular ring 15. A headed screw 20 secures the blocks 17 in position on the outer surface of the ring 15. A resilient material 21 such as rubber may be used between the blocks 17 and the annular ring 15 to permit substantial relative rotation of the driving and the driven members 1 and 2. The blocks 17 may be made of any suitable material having self-lubricating features such as impregnated wood, bakelite, lignum vitae, metal and like materials. A self-lubricating solid coupling member or a coupling member having lubricating facilitates as shown at 22 in Fig. 8 may be used in conjunction with jaws 8 in place of the segmental coupling member 14 as described above.

Fig. 9 shows a modified form of coupling member in which the annular ring 15 described above is replaced by a quadrangular member 23 having a reenforcing web 24 and four triangular blocks 25 are disposed on the outer surfaces thereof. A tongue 26 is provided on the outer surfaces of the member 23, to engage grooves 27 in the blocks 25. Screw means 28 are used to secure the blocks 25 on the surfaces of the member 23. Any suitable elastic material (not shown) may be disposed between the blocks 25 and the outer surface of the member 23 to provide for substantial relative rotation of the driving and driven members 1 and 2.

Although I have shown only two jaws disposed opposite each other on the driving and driven members 1 and 2, it will be understood that I am not confining myself to two jaws. I have also shown four segmental blocks in the coupling members as a preferred form but I am not confining my invention to four blocks. As shown in Figs. 3, 4, and 10, the grain in the blocks 17 and 25 are so disposed that the cross-grains are exposed to provide a longer wearing surface for the bearing surfaces of the blocks. The grains may extend in the directions shown in either Figs. 3 and 10 or 4 and 11 and still provide a cross-grained bearing surface on each bearing side. Each block is independent of the other and one may be removed without disturbing the other three blocks by merely removing the jaws in which it is in engagement.

Figure 14:
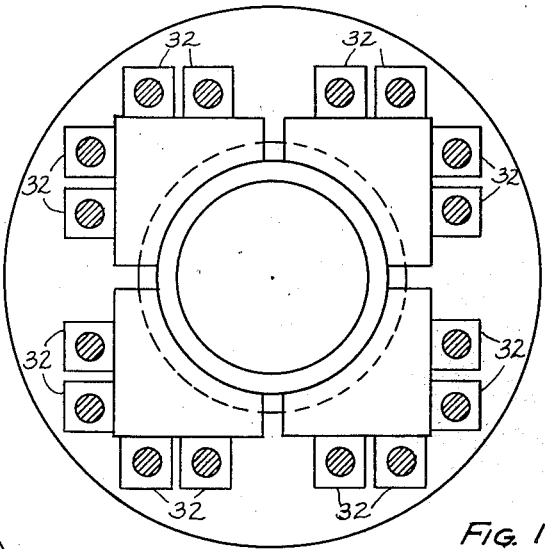
Figure 15:
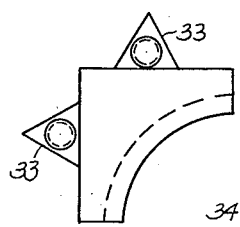
Figure 16:
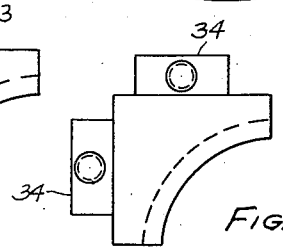

Although I have shown the preferred form of my invention with pivoted jaws 8 having four sides which may be used as bearing surfaces, a jaw 30 as shown in Fig. 12 could be used in place of the square jaws 8 or any other jaws which have inner bearing surfaces and are pivoted could be used. Fig. 13 shows the use of round jaw members 31, Fig. 14 shows the use of jaw members 32 in pairs, Fig. 15 triangular jaw members 33, and Fig. 16 rectangular jaw members 34.

The coupling is connected to two shafts by placing and driving member 1 and the driven member 2 on the ends of the driving and driven shafts 3 and 4 as shown in Fig. 2. The jaws 8 on either the driving member 1 or the driven member 2 are removed so that the shafts may be trued. This would not be possible in the solid jaw type of coupling as the jaws would interlock with one another. The segmental blocks are then disposed on the outer surface of the annular ring 15 or the quadrangular member 23, with or without the use of an elastic material therebetween, and placed between the jaws. The jaws which were removed would then be placed in position with the two shafts in perfect alignment. The bearing surfaces of the jaws if made of wood has the cross-grains exposed to provide a longer wearing surface with resulting longer life. The use of the four sides of each jaw as an inner bearing surface greatly increases the life of the jaws of the coupling. Since most shafts rotate in one direction the greater part of the time, the wear takes place on diagonally opposite corners of the coupling member and on the engaging jaws disposed at the opposite corners where the wear takes place. It will be seen, therefore, that it is only necessary for me to remove the blocks at the two corners where the wear takes place which greatly increases the efficiency of my coupling member. The jaws at these corners with the use of four sides as bearing surfaces provides a coupling which may be repaired in a few minutes because of the arrangement of the parts with saving of time in man-power and connecting machines. When shafts of connected machines extend into the area provided therefor in ordinary coupling members, it is not possible to remove the coupling member without loosening the foundation of the connecting machines. In my coupling member, only the segmental blocks need replacement and this may be done while the coupling is in assembled position by merely removing a stud.

It will be apparent that I have provided a coupling which is easily assembled, has easily replaceable parts, requires no milling operations in manufacture thereby greatly decreasing the original cost.

Various changes may be made in the specific embodiment of the present invention without diverting from the spirit thereof, or within the scope of the appended claims.

What I claim is:

1. In a coupling having a floating block connection, in combination, a driving and a driven member, a plurality of detachable pivoted jaws having inner bearing surfaces disposed on said driving and driven members in substantial parallel relation to oppositely disposed inner bearing surfaces, and a coupling member coacting with the inner bearing surfaces of said jaws to transmit power from said driving to said driven member.

2. A coupling comprising a driving and a driven member, a plurality of pivoted jaws having inner bearing surfaces in substantial parallel relation with oppositely disposed inner bearing surfaces mounted on said driving and said driven members, and a coupling member comprising a plurality of segmental blocks to transmit power from said driving to said driven member in engagement with said bearing surfaces of said jaws.

3. A coupling comprising a driving and a driven member, a plurality of pivoted polygonal jaws mounted on said driving and said driven members, each of said jaws having its outer side surfaces adapted to serve as inner bearing surfaces in substantial parallel relation with oppositely disposed inner bearing surfaces, and a coupling member coacting with said jaws to transmit power from said driving to said driven member.

4. A coupling comprising a driving and a driven member, a plurality of polygonal jaws on said driving and said driven members each having its sides adapted to serve as inner bearing surfaces in parallel relation with oppositely disposed inner bearing surfaces, and a coupling member having a plurality of segmental blocks coacting with the inner bearing surfaces of said jaws to transmit power from said driving member to said driven member.

5. A coupling comprising a driving and a driven member, a plurality of square jaws each having a plurality of bearing surfaces adapted to serve as inner bearing surfaces in parallel relation with oppositely disposed inner bearing surfaces mounted on said driving and said driven members, a coupling member comprising a supporting member and a plurality of segmental blocks mounted on said supporting member, said blocks engaging the inner bearing surfaces of said jaws to transmit power from said driving member to said driven member.

6. A coupling comprising a driving and a driven member, a plurality of detachable polygonal jaws disposed on said driving and said driven members having their sides adapted to be used as inner bearing surfaces disposed in substantial parallel relation with oppositely disposed inner bearing surfaces, and a coupling member comprising a plurality of independent segmental blocks coacting with the inner sides of said jaws to transmit power from said driving member to said driven member.

7. A flexible coupling comprising a driving and a driven member, a plurality of pivoted polygonal jaws disposed on said driving and said driven members having their sides adapted to be faced inwardly and to be used as inner bearing surfaces disposed in substantial parallel relation to oppositely disposed inner bearing surfaces, and a coupling member comprising a plurality of independently detachable segmental blocks for engaging the inwardly directed sides of said jaws to transmit power from said driving member to said driven member.

8. A flexible coupling comprising a driving and a driven member, a plurality of detachable pivoted polygonal jaws disposed on said driving and said driven members, and a coupling member comprising a plurality of independently detachable segmental blocks for engagement with said jaws, said jaws having their sides all adapted to serve as inner bearing surfaces in substantial parallel relation to oppositely disposed inner bearing surfaces to engage said coupling member to transmit power from said driving member to said driven member.

9. A flexible coupling comprising a driving and a driven member, a plurality of movable square jaws having their inwardly directed bearing surfaces in substantial parallel relation to oppositely disposed inner bearing surfaces disposed on said driving and said driven members, and a coupling member comprising a plurality of independently removable segmental blocks having cross-grained outer bearing surfaces coacting with the inner bearing surfaces of said jaws to transmit power from said driving member to said driven member.

10. A coupling comprising a driving and a driven member, a plurality of jaws having inner bearing surfaces in substantial parallel relation to oppositely disposed inner bearing surfaces disposed on said driving and said driven members, and a coupling member comprising a cushioning member and a plurality of independently removable segmental blocks cushioned by said cushioning member to coact with the inner bearing surfaces of said jaws to transmit power from said driving member to said driven member.

11. A coupling comprising a driving and a driven member, a plurality of detachable and tiltable polygonal jaws having sides thereof disposed to serve as inner bearing surfaces in substantial parallel relation to oppositely disposed inner bearing surfaces mounted on said driving and said driven members, and a coupling member comprising an inner supporting member, and segmental blocks carried by said supporting member for engagement with the inner surfaces of said jaws to transmit power from said driving member to said driven member.

12. Same claim as claim 11 wherein an elastic material is disposed between the supporting member and the segmental blocks to permit substantial relative rotation of said driving and said driven members.

13. A coupling comprising a driving and a driven member, a plurality of polygonal jaws having a plurality of sides disposed on said driving and said driven members, all of said sides adapted for use as inner bearing surfaces in substantial parallel relation to oppositely disposed inner bearing surfaces, and a coupling member comprising a plurality of segmental blocks having the outer bearing surfaces thereof cross-grained for engagement with said coupling member to transmit power from said driving member to said driven member.

14. A coupling comprising a driving and a driven member, a plurality of pivoted detachable polygonal jaws having inner bearing surfaces in substantial parallel relation with oppositely disposed inner bearing surfaces mounted on said driving and said driven members, and a coupling member coacting with the inner bearing surfaces of said jaws to transmit power from said driving member to said driven member.

15. A coupling comprising a driving and a driven member, a plurality of jaws having inner bearing surfaces in substantial parallel relation with oppositely disposed inner bearing surfaces mounted on said driving and said driven member, and a coupling member having a plurality of independently detachable polyhedral blocks coacting with the inner surfaces of said jaws to transmit power from said driving member to said driven member.

GEORGE H. THOMAS.